June 12, 1951     A. C. McKNIGHT, JR     2,556,365
PORTABLE OUTDOOR COOKING STOVE AND BARBECUE
Filed Oct. 3, 1947     2 Sheets-Sheet 2
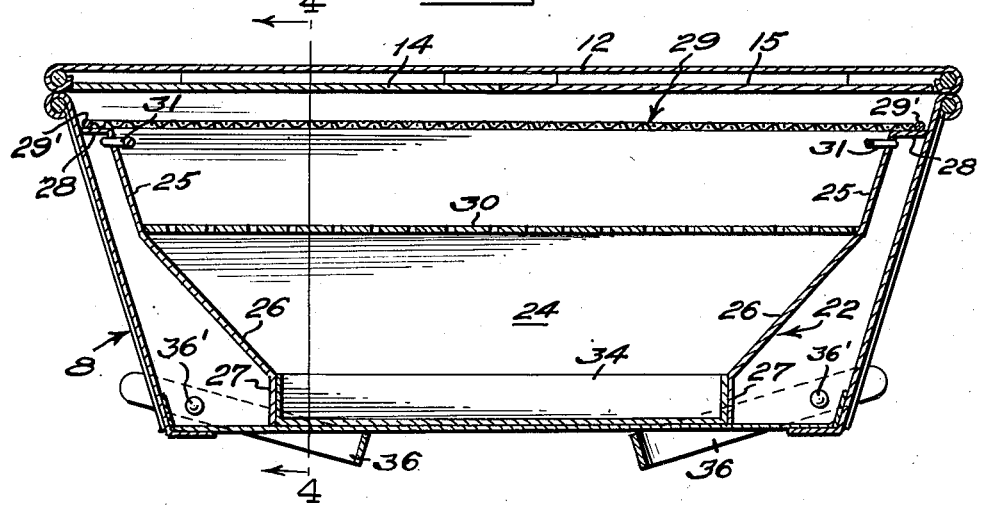
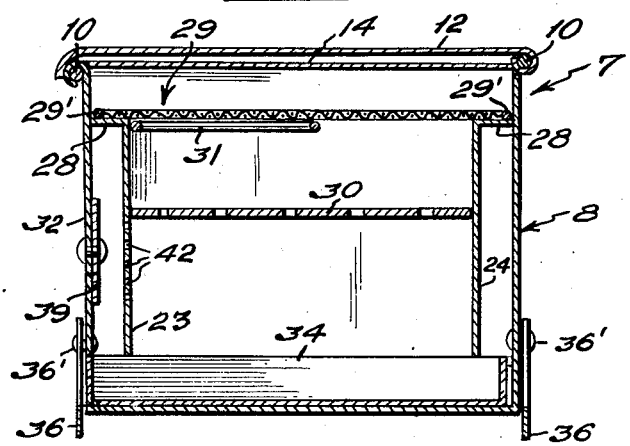
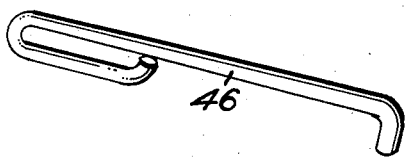
Inventor
Arch C. McKnight, Jr.
By Randolph & Beavers
Attorneys Patented June 12, 1951

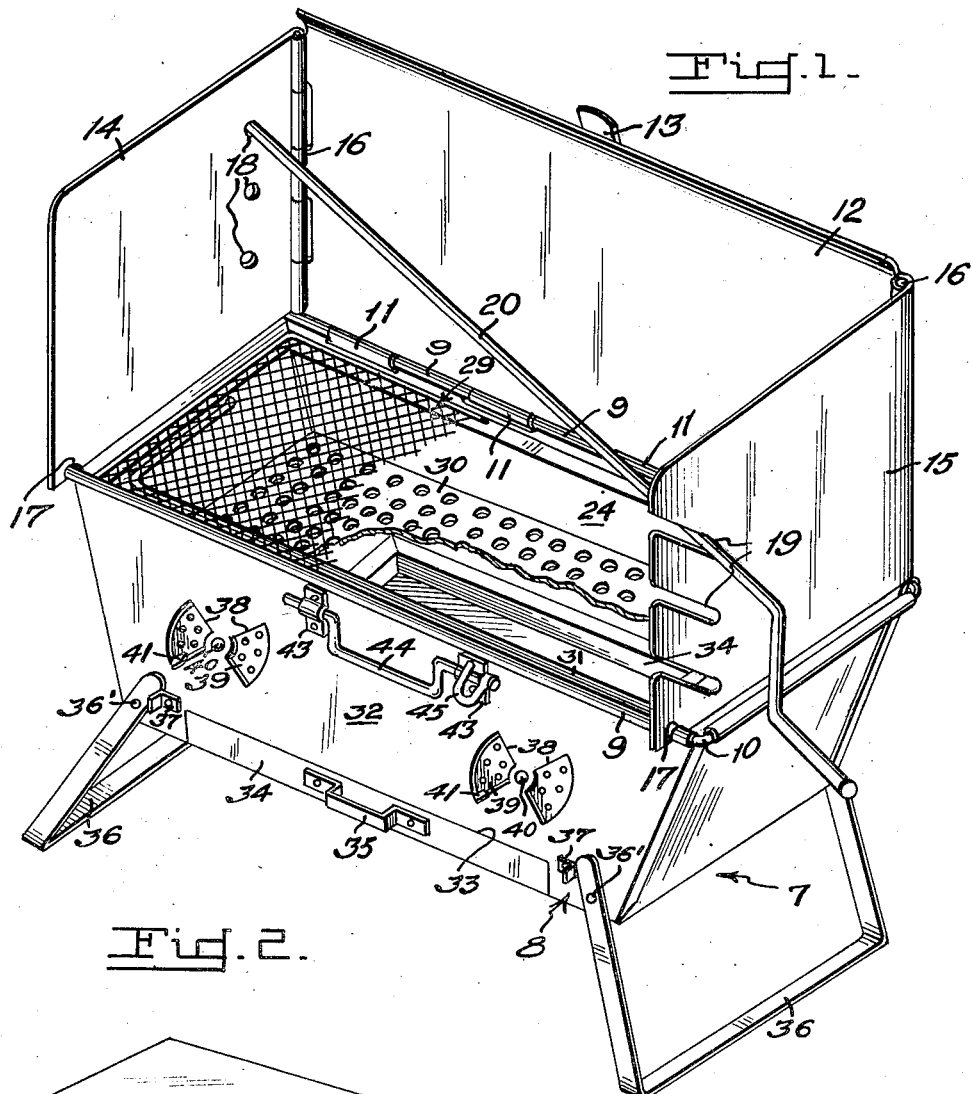

2,556,365

UNITED STATES PATENT OFFICE 2,556,365

PORTABLE OUTDOOR COOKING STOVE AND BARBECUE

Arch C. McKnight, Jr., Torrance, Calif.

Application October 3, 1947, Serial No. 777,806

2 Claims. (Cl. 126—9)

This invention relates to a combination portable outdoor cooking stove and barbecue of extremely simple construction which is capable of being readily closed up into a compact unit for storage or transportation and which may be readily opened for use to provide a compact cooking stove and barbecue adapted to be employed out of doors for the cooking of various foods and which may utilize various fuels including charcoal and wood.

More particularly, it is a primary object of the present invention to provide a simple and compact combination of stove and barbecue. Through the dual utilization of many of the parts thereof an extremely simple and compact unit is produced which may be efficiently employed for cooking or barbecuing and which may be readily disassembled for removing the ashes and larger residue of the fuel and for maintaining the unit in a clean, sanitary condition.

Still a further object of the invention is to provide a combination stove and barbecue all of parts which can be readily packed in or secured to an outer shelf thereof for storage or transportation.

Various other objects and advantages of the invention will hereinafter become more fully apparent from the following description of the drawings, illustrating a presently preferred embodiment thereof, and wherein:

Figure 1 is a perspective view on an enlarged scale showing the combination stove and barbecue in an open, operative condition partly broken away to illustrate internal parts thereof;

Figure 2 is a perspective view on a smaller scale showing the unit collapsed and closed for storage and transportation;

Figure 3 is a longitudinal sectional view of the unit in a closed position and on an enlarged scale relatively to Figure 2;

Figure 4 is a cross sectional view of the unit taken substantially along a plane and indicated by the line 4—4 Figure 3, and Figure 5 is a perspective view of one element of the stove or barbecue.

Referring more specifically to the drawings, the combination portable stove and barbecue, comprising the invention, is designated generally 7 and includes an outer receptacle, designated generally 8 constituting the shell or casing thereof which is preferably formed of sheet metal and includes a substantially flat bottom, upwardly extending, substantially parallel front and rear walls and upwardly and outwardly inclined end walls. The front, rear and end walls are rolled outwardly at their upper edges to provide barrel portions 9 through which a rod or a heavy gage strand of wire 10 extends for reinforcing said upper edges and the barrel portion, forming a part of the back wall is provided with spaced cut-out portions for interfitting engagement with spaced barrel portions 11 of a cover 12 through which a portion of the rod 10 also extends for hingedly mounting the cover 12 on the upper edge of the rear wall of the receptacle 8. The cover 12 at its free edge and intermediate of its ends is provided with a finger hold 13 and has wing members or shields 14 and 15 hingedly connected, as seen at 16, at the ends thereof and which wings or shields are a height or width substantially equal to but slightly less than that of the cover 12 and of a length slightly greater than the width of the receptacle 8. The bottom edges of the shields 14 and 15 are notched as seen at 17, adjacent their free ends and said notches are adapted to engage on the barrel portion 9 of the front wall of the receptacle for supporting the shields and cover in substantially upright, extending positions, as seen in Figure 1. The shield 14 is provided with a series of space openings 18 disposed adjacent its hinged end 16 and parallel thereto and the shield 15 is provided with a corresponding number of the elongated notches 19 which extend generally longitudinally thereof and which are inclined upwardly and outwardly and open outwardly of the free edge or end of the shield 15 and have their inner closed ends disposed at substantially the same level as the openings 18. The openings 18 and notches 19, as seen in Figure 1, are adapted to adjustably support a spit 20 which is selectively applied thereto by inserting the pointed end of the spit through anyone of the openings 18 and thereafter engaging the shank of the spit, adjacent its crank, with the corresponding notch 19 by the insertion thereof through the open end of the notch and into the position as seen in Figure 1, depending upon how high above the shell or receptacle 8 it is desired to position the spit.

As best seen in Figures 3 and 4, an inner shell or fire box 22 is demountably disposed within the outer shell or receptacle 8 and includes a receptacle which is open at its top and bottom and which has substantially upright front and rear walls 23 and 24, respectively, and corresponding inclined end walls each including an upper, downwardly and inwardly inclined portion 25 and a lower downwardly and inwardly inclined portion 26. The end wall portions 25 are disposed substantially parallel to the end walls of the receptacle 8 while the lower portions 26 are inclined inwardly toward one another and at angle to said end walls of receptacle 8. The wall portions 26 extend downwardly to the level of the bottom edges of the front and rear walls 23 and 24 and terminate in perpendicular, downwardly extending flanges 27 which rest upon the bottom of the receptacle 8 so that the bottom edges of the walls 23 and 24 are supported thereby above the level of the bottom of the receptacle 8, for a purpose will hereinafter become apparent. The upper edges of the front, rear and end walls of the inner shell or fire box 22 terminate in out-turned flanges 28 which engage against the inner sides of the front, rear and end walls of the receptacle 8 to provide a support for a grill 29 which is preferably formed of heavy gage mesh wire fabric supported on a frame 29'. The upper ends of the end wall portions 26 provide a support for an apertured plate of any suitable fire resistant material forming a grate 30 and which is demountably supported thereby substantially below the level of the grill 29 and which is adapted to support a suitable fuel, not shown, such as charcoal or wood. A bail 31 has out-turned terminals which extend rotatably through apertures in the wall portion 25 and which is normally supported thereby beneath the grill 29. The bail 31 can be swung upwardly from its inoperative position beneath the grill 29, as illustrated in Figures 1 and 4, by first removing said grill and may then be utilized for lifting the inner shell or fire box 22 out of the outer shell or receptacle 8 to facilitate the removal of the grate 30 through the open top of the fire box for cleaning the grate and fire box.

The front wall 32 of the receptacle 8 is provided adjacent its bottom with an opening 33 normally closed by the outer end of an ash drawer 34 equipped with a handle 35. The ash drawer 34, as best seen in Figures 3 and 4, slidably engages the upper side of the receptacle bottom and is guided between the flanges 27 and passes below the front and rear walls 23 and 24 of the inner shell 22 for receiving ashes dropping from grate 30 and which can be removed by removal of said drawer through the opening 33.

The stove and barbecue 7 is normally supported in an elevated position by means of a pair of substantially U-shaped supporting legs 36 the parallel portions of which are pivotally connected by rivets or other fastenings 36' to the front and rear walls of the shell 8. The legs 36 extend downwardly and outwardly when in extended position and are limited in the extent that they can be swung outwardly by lugs forming stops 37 which are secured to the front wall 32 or which may be secured to both the front and rear walls of said shell 8. The legs 36 are swung inwardly against the bottom of the shell 8 when the stove or barbecue 7 is closed up for storage or transportation and portions of corresponding parts thereof overlie the drawer 34, as seen in Figure 2, to prevent removal of said drawer until the legs 36 are again extended.

The front wall 32 is provided with pairs of draft openings 38 regulated by damper valves 39, each of which controls two of said openings 38 and which is pivotally mounted intermediate of its ends on a rivet or fastening 40 to the wall 32 and each of which is provided with a lug or finger hold 41 by means of which said valve may be moved from closed to open or partially open position. The front wall 23 for the fire box 22 is provided with apertures 42, adjacent said damper openings 38 for admitting air to the lower portion of the fire box below the grate 30.

The front wall 32 is provided on its outer side with strap member 43 having aligned barrel portions for journaling the aligned end portions of a handle 44 and one of said end portions is provided with a hook 45 which is engageable over the cover 12 when the latter is in a closed position and when the handle 44 is swung outwardly to a position substantially perpendicular to said front wall 32.

The stove or barbecue 7 is employed in a conventional manner for cooking or barbecuing with the grate 29 being utilized for cooking various food items and with the spit 20 employed for barbecuing meat. The ashes of the fuel passing through the grate 30 will fall into the drawer 34 from where they can be removed by removal of said drawer and the draft to the lower portion of the fire box 22 can be regulated by the damper valves 39 which may be initially opened fully for obtaining a hot fire and thereafter partially closed or fully closed to effect a slow burning of the fire. The stove 7 may be placed on the ground or on any other suitable supporting surface and the legs 36 will prevent the heat from the stove damaging said surface. The shields 14 and 15 in addition to providing an adjustable support for the spit 20 also in combination with the cover 22, function as a wind shield. A poker 46, as seen in Figure 5, is provided and will function in its conventional manner and which may be additionally utilized to assist in removing the grill 29 and grate 30 when said parts are hot.

For closing the stove and barbecue for storage or transportation, the poker 46 is placed on the grate or grill and with said part and the inner shell or fire box 22 nested within the outer shell or receptacle 8, spit 20 is removed from the shields 14 and 15 and said shields swung inwardly against the cover 12 after which said cover is closed, as seen in Figures 2, 3, and 4. The spit 20 is then placed against the free edge of the closed cover 12 and the handle 44 is swung to a perpendicular position as in Figure 2 causing the hook to engage over the cover 12 and to also engage and hold spit 20. The legs 36 are folded against the bottom of the receptacle 8 for holding the drawer 34 in place and the stove and barbecue 7 is then ready to be carried or stored.

Various changes and modifications are contemplated and may obviously be resorted to, without departing from the spirit and scope of the invention as hereinafter defined by the appended claims.

I claim as my invention:

1. In a combination portable outdoor cooking stove and barbecue, an open top receptacle forming the outer shell thereof and having a cover hinged along one of its edges to the upper edge of one side of said receptacle and provided with wing members hinged to the ends thereof to combine therewith to form a shield when in open, extended positions, an inner shell or fire box detachably mounted in said outer shell or receptacle, a grate demountably supported in said fire box intermediate of its top and bottom, said fire box having an open bottom, and an ash drawer slidably mounted in one wall of the outer shell or receptacle for disposition beneath said open bottom for receiving the ashes from said grate, said fire box having end walls provided with depending flanges extending below the bottom edges of the side walls thereof and adapted to rest on the receptacle bottom to form guides between which said ash drawer is slidable, and the bottom edges of said side walls being disposed closely adjacent the open top of the ash drawer.

2. In a combination portable outdoor cooking stove and barbecue, an open top receptacle forming the outer shell thereof and having a cover hinged along one of its edges to the upper edge of one side of said receptacle and provided with wing members hinged to the ends thereof to combine therewith to form a shield when in open, extended positions, an inner shell or fire box detachably mounted in said outer shell or receptacle, a grate demountably supported in said fire box intermediate of its top and bottom, said wings being foldable against the inner side of said cover and said cover being swingable to a closed position covering the open top of said outer shell or receptacle, and a handle pivotally mounted on the other side wall of the outer shell and provided with a hook connected to and swingable with the handle and disposed for latching the cover in a closed position when the handle is disposed in an extended, carrying position.

ARCH C. McKNIGHT, Jr.

REFERENCES CITED

The following references are of record in the file of this patent:

UNITED STATES PATENTS

| Number | Name | Date |
|---|---|---|
| D. 142,418 | Jones | Sept. 25, 1945 |
| D. 144,431 | Talley | Apr. 9, 1946 |
| 1,545,584 | Devereux | July 14, 1925 |
| 2,161,669 | Freeman | June 6, 1939 |
| 2,302,984 | Tollzien | Nov. 24, 1942 |
| 2,307,914 | Bitney | Jan. 12, 1943 |
| 2,334,847 | Spiers | Nov. 23, 1943 |
| 2,497,994 | Jones | Feb. 21, 1950 |

FOREIGN PATENTS

| Number | Country | Date |
|---|---|---|
| 8,649 | Great Britain | May 1, 1894 |
| 350,501 | France | Apr. 13, 1905 |